July 30, 1935.  L. D. JONES  2,009,890

FEEDING SYSTEM FOR FLUIDS

Filed Oct. 4, 1932   4 Sheets-Sheet 1

INVENTOR.
LEO D. JONES
BY
*Maurice A. Crews*
ATTORNEY.

July 30, 1935.  L. D. JONES  2,009,890

FEEDING SYSTEM FOR FLUIDS

Filed Oct. 4, 1932   4 Sheets-Sheet 2

INVENTOR.
Leo D. Jones
BY *Maurice A. Crews*
ATTORNEY.

July 30, 1935.　　　　L. D. JONES　　　　2,009,890
FEEDING SYSTEM FOR FLUIDS
Filed Oct. 4, 1932　　　4 Sheets-Sheet 3
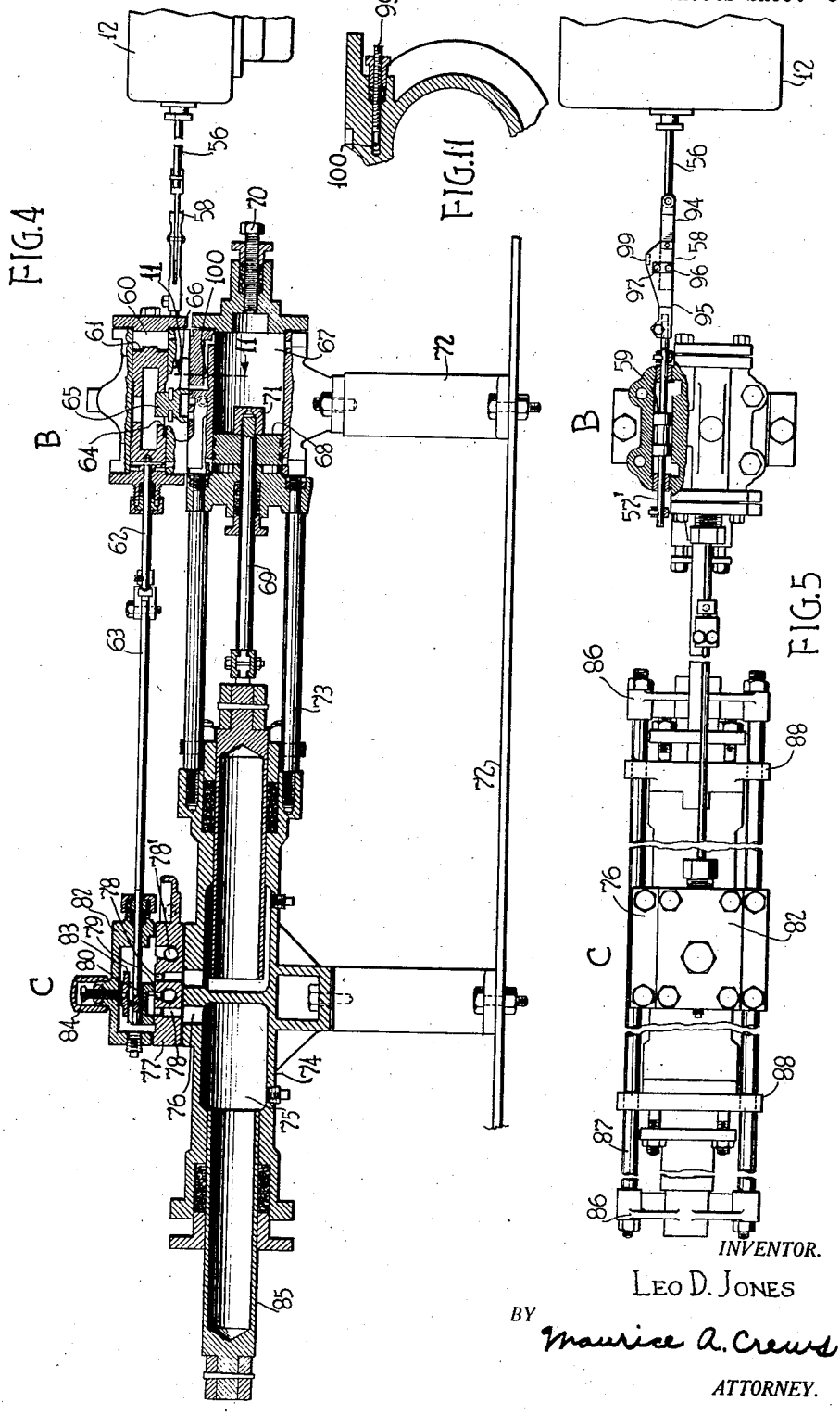
INVENTOR.
Leo D. Jones
BY Maurice A. Crews
ATTORNEY.

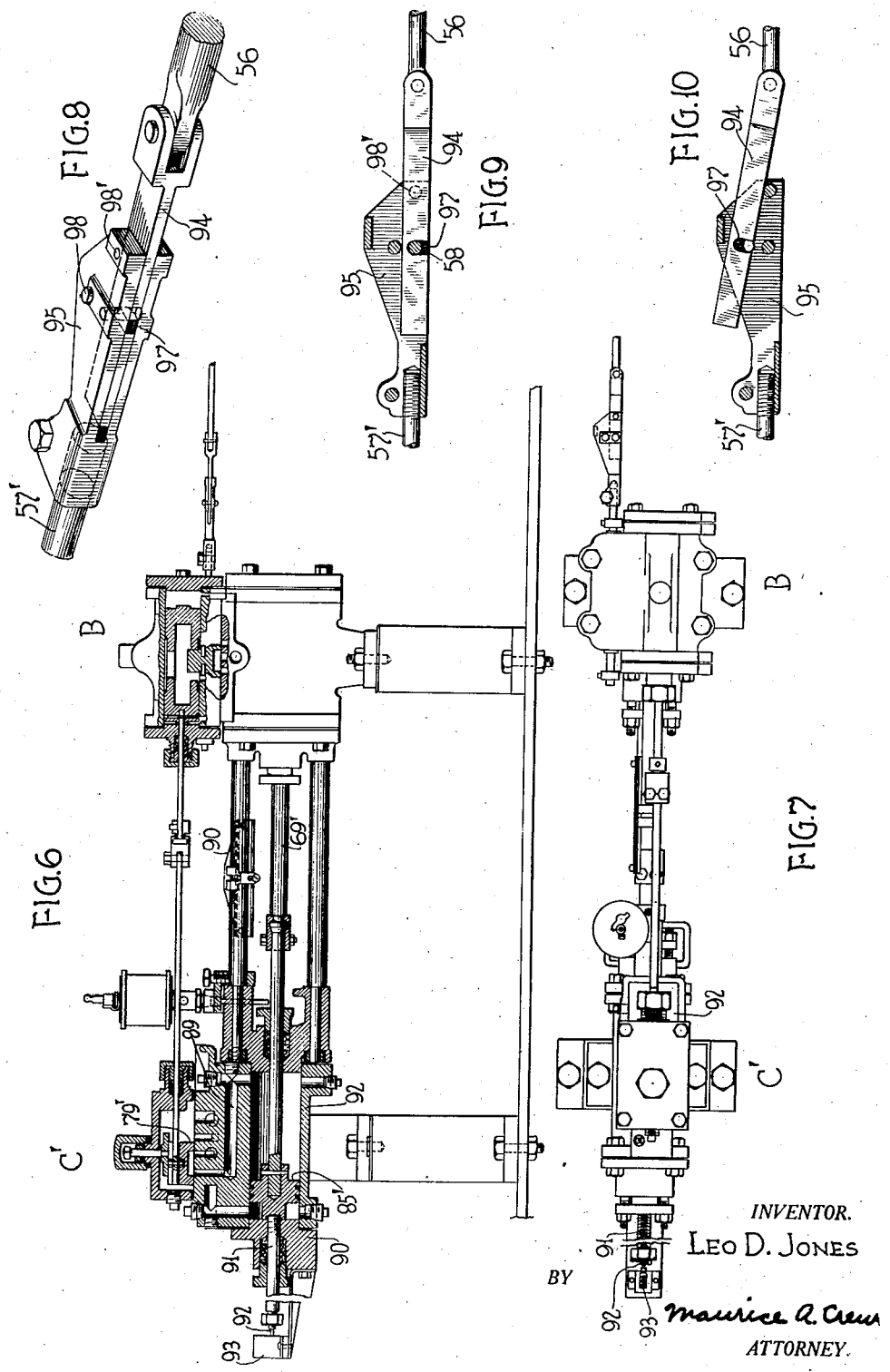

Patented July 30, 1935

2,009,890

UNITED STATES PATENT OFFICE 2,009,890

FEEDING SYSTEM FOR FLUIDS

Leo D. Jones, Philadelphia, Pa., assignor to The Sharples Specialty Company, Philadelphia, Pa., a corporation of Delaware Application October 4, 1932, Serial No. 636,167

13 Claims. (Cl. 137—165)

The present invention relates to mechanisms and methods for feeding fluids in separate conduits and it was conceived with reference to the problem of effecting a relative control of the feed of liquids through such conduits. Its principal object has been to effect an adequately controlled feed of this type in which the volumetric proportions of liquid fed through the various conduits are accurately maintained. A further object has been to effect a control of the feed of liquid in a controlling conduit in which positive means are provided for impelling liquid in the controlled conduits which are operable in response to the volume of liquid flowing through the controlling conduit regardless of the pressure upon the liquid in such controlling conduit.

In the art of continuously treating one chemical substance with another, it is highly important that the relative proportions of the two substances be accurately controlled, and the present invention constitutes an effective solution of the problem of the accurate maintenance of such control under conditions of varying rate of feed of the liquids under treatment. Where such substances are fed to a mixing chamber and thereafter fed to other portions of the particular system involved, it is frequently desirable to vary the rate of egress of liquids from the mixer by direct control of the conduits or elements of the system through which such egress is effected. Such control is inconsistent with the use of constant volume feed mechanisms such as reciprocating pumps for impelling the liquids toward the mixer through all of the conduits, and it is accordingly highly desirable that at least the principal impelling mechanism for the controlling feed conduit be in the nature of a constant pressure impeller such as a centrifugal pump. Where such an impeller is used, adequate control may be effected from the discharge end of the mixer without danger of such an increase of pressure within the system as might result in breakage of parts.

In accordance with the present invention, an impeller of the constant pressure type is employed for feeding fluid through the controlling conduit and this liquid passes through a control device which effects a control of one or more prime movers or other mechanism for impelling a liquid or liquids in auxiliary conduits in volumetrically controlled amounts with respect to the flow of liquid in the controlling conduit. Thus, in the operation of my system, when the volume of liquid leaving the mixer is changed in any way, the volume flowing in the controlling conduit is correspondingly reduced and the speed of operation of the prime movers effecting the feed in the auxiliary conduits is likewise reduced through the operation of the control device to effect an accurately proportioned reduction of the rate of feed in each of the conduits.

It will thus be seen that my invention contemplates an accurately proportioned feed through the various conduits regardless of whether this feed be fast or slow and that this feed will always be maintained in properly proportioned amounts of the various constituents.

My present invention constitutes an improvement over that described and claimed in my copending application, Serial No. 603,152, filed April 4, 1932, and certain features described but not claimed in the present case are subject to claims in that application.

Further objects and advantages of my invention relating both to the details and principles of operation will be in part obvious and in part elaborated upon in the following specification.

In the drawings, Figure 1 is a plan view illustrating the general arrangement of apparatus in accordance with my invention and its application to a system for feeding and mixing substances and thereafter effecting a centrifugal separation of the resultants of the reaction.

Figure 4 is a vertical cross-section illustrating the construction of the prime mover and apparatus controlled thereby for feeding an auxiliary liquid.

Figure 5 is a plan view of the apparatus illustrated in Figure 4, parts being shown in section for the purpose of illustration.

Figures 6 and 7 are views similar to Figures 4 and 5 respectively, illustrating a modified form of my invention.

Figure 8 is a detail perspective view of a portion of the connecting linkage.

Figure 9 is a vertical cross-section through the linkage of Figure 8.

Figure 10 is a view similar to Figure 9, illustrating the parts in a different position.

Figure 11 is a section on the line 11—11 of Figure 4.

Figure 1:
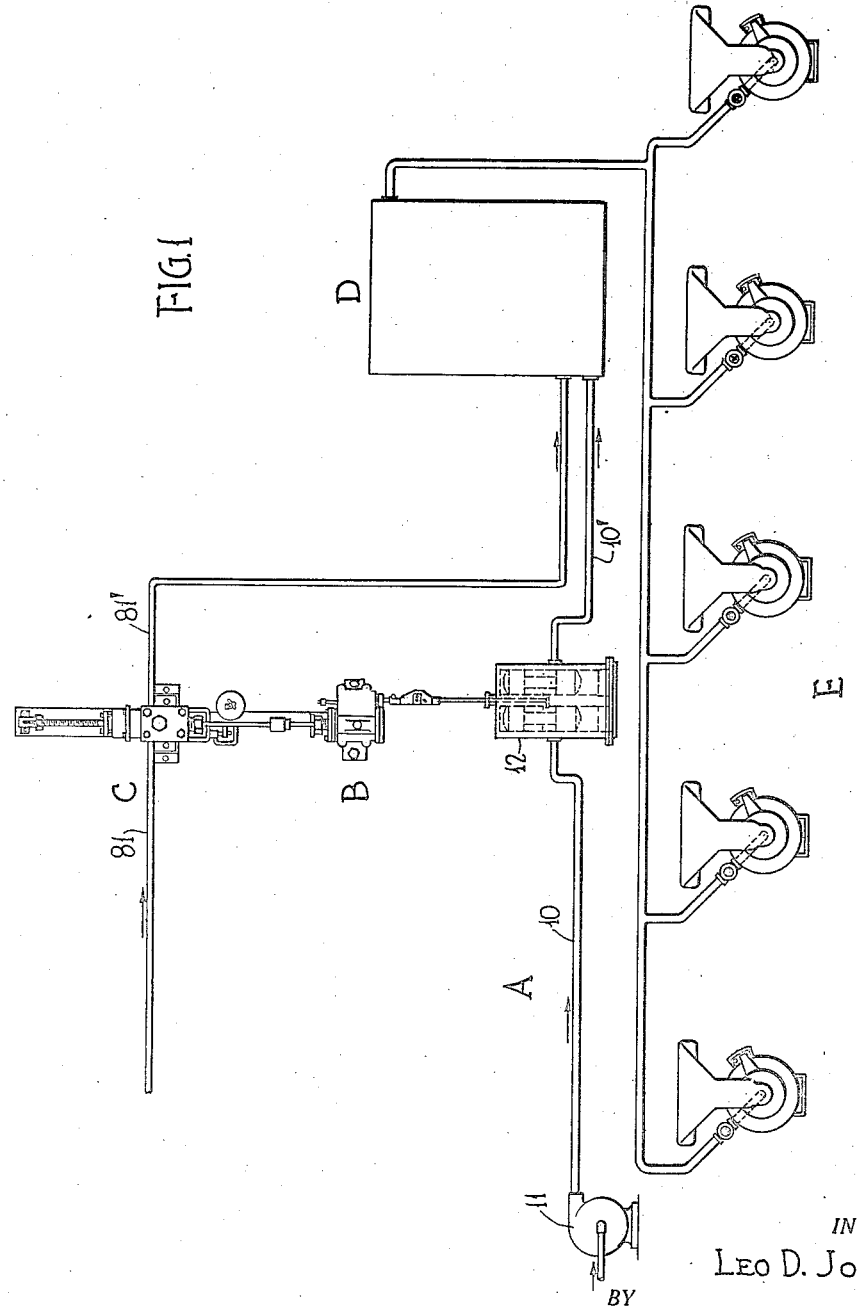

As above explained, my system may be employed in the treatment of various types of substances. I am of the opinion that it will find one of its principal uses in the acid treatment of petroleum oils and it will therefore be described with reference to an operation of that character. This method of presentation is chosen solely for the purpose of clarity of description, and I do not have any intention of limiting the scope of my patent protection to this particular use, as my system may be used in many other connections.

The system involves in general, separate sources of supply from which the oil and acid are fed to a mixing chamber. The oil is preferably fed by constant pressure impelling apparatus and is passed through a displacement meter. This meter is provided with moving parts which are displaced in exact proportion to the amount of oil which flows therethrough and in turn control a valve which controls the operation of a prime mover or other mechanism to effect a feed of acid in direct volumetric proportion to the amount of oil which flows through the displacement meter. The system further involves readily adjustable means for varying this proportion as hereinafter set forth. The conduit including the displacement meter through which the oil is fed is indicated generally at A and the prime mover or other mechanism for driving the impelling mechanism for feeding acid is indicated at B. The impelling mechanism proper is designated at C and the mixer to which oil and acid are fed at D. In the particular system illustrated, the mixture of oil and sludge is fed to a battery of centrifugal separators E in parallel. A displacement meter 12 in the oil feed line A controls the operation of the prime mover B to effect an operation of this prime mover, this operation being directly controlled by the volume of oil flowing in the line A and accordingly effecting a proportionate flow of acid through the impeller C.

Referring to the drawings more specifically by reference characters, the oil to be purified is fed to the conduit 10 by a device capable of supplying it at constant pressure, such for example as centrifugal pump 11. Oil supplied through conduit 10 is passed to conduit 10' through a metering device 12 which contains a movable part or parts which are positively displaced to an extent and frequency whose product is directly proportional to the volume of oil flowing through the system. Thus, referring to Figures 2 and 3 of the drawings, there are a pair of opposed cylinders 13 and 14 and a similar pair of opposed cylinders 15 and 16. Within cylinders 13 and 14 there is a pair of interconnected pistons comprising a piston 19 engaging the walls of the cylinder 13 and a piston 20 engaging the walls of the cylinder 14, these pistons being interconnected by a connecting portion 21 of reduced diameter. A similar pair of pistons operates within the cylinders 15 and 16. An opening 22 is formed in the common wall 23 between the pairs of cylinders, thus forming a space 24 within the walls of the device 12 into which liquid is introduced by means of conduit 10. In the arrangement of my apparatus, every particle of liquid which passes through the pipes 10 and 10' effects a proportionate displacement of the pistons within the cylinders. To this end, x suitable valve mechanisms are employed to control the flow of liquid from the space 24 between the cylinders to the cylinders 13, 14, 15 and 16 and from these cylinders to the passage 25 which is formed in the body of the cylinder casing and from which liquid discharges into an opening in the hollow boss 12' to which the discharge pipe 10' of the oil feed system is secured. Thus, in the construction illustrated in Figures 2 and 3, passages 26 and 27, respectively, lead to cylinders 13 and 14 from ports 28 and 29, respectively, and an intermediate port 30 communicates with a discharge passage 25 leading through the wall of the cylinder casing to the interior of the boss 12' which communicates with the discharge pipe 10'. Similarly, passages 34 and 36 lead from ports 35 and 37 to cylinders 15 and 16, respectively, and similar ports 35, 37 and 38 control the flow of liquid from the space 24 into these cylinders and from the cylinders into the discharge passage 25 leading to the discharge pipe 10'.

Figure 2:
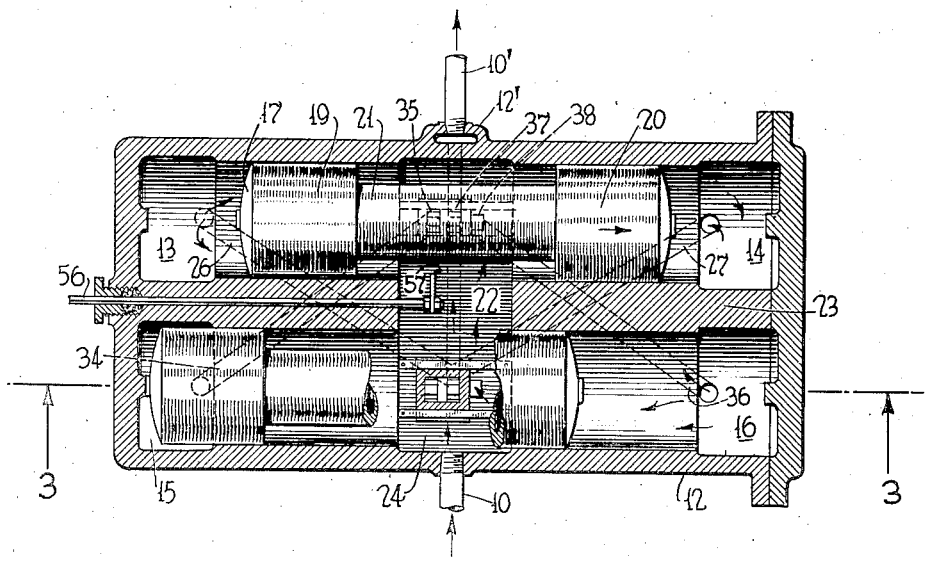
Figure 2 is a central horizontal cross-section through a control device forming an important part of the system.
Figure 3:
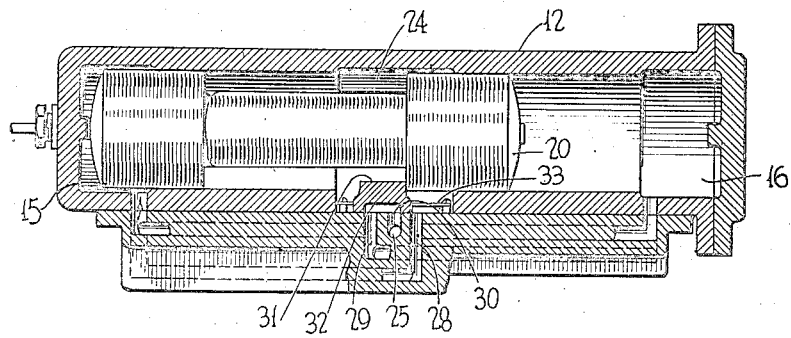
Figure 3 is a cross-section on the line 3—3 of Figure 2.

Cooperating with the ports 28, 29, 30 and 35, 37 and 38 are identical valve devices. Each of these devices consists of a movable valve member having a concave lower face 32 adapted to interconnect two of the ports. Thus, the valve device 31 illustrated in Figure 3 of the drawings interconnects the ports 29 and 30 to permit discharge of liquid from the cylinder 14 during the exhausting thereof by the movement of the piston 20 to the right as illustrated in Figure 2 and interconnects the ports 28 and 30 during the reverse movement of that piston to permit the exhausting of the cylinder 13. The valves are held in close engagement with the surfaces upon which they rest by the pressure of the liquid within the space 24 and this pressure may be increased by guiding the valves along spring strips 33 secured within the casing and each passing through a slot in its respective valve. These strips also restrain the valves against sidewise movement and thus not only insure a firm seating of the valves, but also serve the additional function of guiding them in their reciprocating movement. The pistons are undercut at their inner extremities to form shoulders which co-act with the valve devices to abut extensions thereon as illustrated in Figure 3. Each of the pistons thus actuates the valve controlling ingress and egress of liquid to and from the adjacent cylinder. Thus, the pistons 19 and 20 at the lower side of Figure 2 control the feed and discharge of liquid to and from the cylinders 13 and 14 and the pistons 19 and 20 at the top of that figure control the feed and discharge to and from the cylinders 15 and 16, respectively.

In the operation of the displacement device 12, liquid is supplied through pipe 10 to chamber 24. Assuming that the parts are in the position shown in Figure 2, liquid will flow through the port 28 to the cylinder 13 and through the ports 29 and 30 from the opposed cylinder 14 into the passage 25 leading to the exhaust port in the boss 12', pistons 19 and 20 moving toward the right at this juncture. At this stage the port 38 communicating with the cylinder 16 is in communication with the space 24 allowing the liquid to hold the lower piston 19 to the left against a boss in the end of the cylinder 15. Near the end of its stroke the upper piston assembly 19 and 20 abuts and moves the upper valve 31 controlling the flow of liquid into cylinders 15 and 16 to place the port 35 into communication with the liquid within the space 24 and to connect ports 37 and 38. As soon as the upper valve 31 has been thrown in this manner, liquid will enter the cylinder 15 and force the lower piston 19 to the right, the liquid within cylinder 16 being forced through the passage 36 and ports 37 and 38 covered by the upper valve 31 into the exhaust passage 25 and pipe 10' by this movement. After the upper piston 19 has effected the movement of the upper valve 31 described above, this piston reaches the end of its stroke toward the right, and it is retained in that position until the lower piston 19 has come to a position in which it approaches the right-hand end of its stroke and thus throws the lower valve 31 into a position in which liquid is admitted into the cylinder 14 and allowed to be expelled from the cylinder 13 through the ports 28 and 30 covered by the lower valve 31. The liquid passes from these ports into the passage 25 from which it leaves the metering device. It will thus be seen that each of the pistons 19 and 20 is alternately reciprocated and that every particle of oil which passes from the pipe 10 to the pipe 10' effects a corresponding displacement of one or the other of the pistons within the cylinders and as both sets of pistons take exactly the same number of strokes and the completion of every stroke of all four pistons is insured by the inter-related control of the valves of the respective sets of cylinders, it will be seen that the number of reciprocations of either of the sets of cylinders will constitute an accurate measure of the volume of oil flowing through the meter. In accordance with the present invention the amount of liquid, e. g., acid, fed by the impelling mechanism C is controlled by the movement of the piston in the metering device. To this end a packed rod 56 is passed through an opening in the casing 23 intermediate the sets of cylinders and provided with a projection 57 which extends from this rod into the space 24 in the path of the pistons in one of the sets of cylinders. Thus, as illustrated, the arm 57 extending from the rod 56 is adapted to be alternately reciprocated in opposite directions by the upper pistons 19 and 20 as they approach the inner ends of their strokes. It will thus be seen that the rod 56 is reciprocated in opposite directions once for each complete cycle of the metering device; i. e., it undergoes one reciprocation every time a quantity of oil corresponding to the sum of the volumes of the cylinders 13, 14, 15 and 16 passes through the metering device. This rod 56 in turn controls the movement of a valve which controls the operation of a prime mover or other device for actuating the impeller for feeding the acid or other controlled liquid to the mixer.

The rod 56, referred to above, operates through a system of linkage to be hereafter described in detail, to effect a reciprocation of a valve rod 57', secured to a conventional piston valve 59, which controls the flow of fluid under pressure to and from the cylinder of a fluid pressure motor. This motor is provided with a piston 61, which is moved in opposite directions in response to the alternate admission of steam to opposite ends of the cylinder 60 by the alternate movements of the valve 59 under the control of the rod 56 reciprocated in response to the flow of oil through the meter 12. It will thus be seen that the piston 61 makes one complete reciprocation within its cylinder every time a pre-determined volume of oil passes through the oil feed system A to the mixer D. In accordance with my invention, this reciprocation of the piston 61 is utilized to effect a corresponding feed of acid to the mixer in a carefully adjusted, proportioned amount with respect to the amount of oil so fed. To this end the piston rod 62, secured to the piston 61, is interconnected with a valve actuating rod 63, which is adapted to effect control of the valve 79 of a reciprocating pump for feeding acid to the system. Similarly, the alternate reciprocations of this piston control the operation of a second reciprocating steam engine which drives the pump. Thus, the positioning of the valve which controls the flow of acid to and from the pump is controlled by the piston 61 in response to the movements of the piston rod 62, and the actual motive power for the pump is similarly controlled by this piston.

In order to effect this latter control, the piston 61 is provided with a pair of abutments 64, adjacent its center on one of its sides, and these abutments are adapted to alternately effect reciprocating movements of a slide valve 66 of a reciprocating steam engine adapted to drive the pump by contact of the shoulders with an abutment 65 upon the valve 66. The cylinder of the second steam engine is designated at 67, and the alternate flow of steam to opposite ends thereof is adapted to effect a reciprocation of the piston 68 in this cylinder. A screw 70 is adjustably secured in one end of this cylinder, and is adapted to limit the stroke of the piston 69 by abutment with a nut or boss 71, secured to the end of the piston rod 69 which is adapted to deliver power from this second steam engine to the pump. It will be seen that the length of the stroke of the piston 68 can readily be adjusted by the simple expedient of adjusting the screw 70 to permit this screw to project a greater or smaller distance into the cylinder 67, thereby limiting the stroke of the piston to the desired extent. As this piston drives the acid feeding pump directly, it will be seen that such an adjustment of the screw 70 will effect a proportionate diminution of the volume of acid fed through the system in proportion to the oil passing through the meter 12. The principal casting of the acid feeding pump is indicated at 74, and this pump is connected with the cylinder 67 of the second steam engine described above, by means of a framework 72, and also through tie-rods 73, which are secured to the head of the cylinder 67 adjacent this casting, and in turn secured to the ends of the casting. The pump is of the outside packed type and is provided with ports 76 adjacent its center wall, which afford provision for the ingress of acid to and egress thereof from the opposed cylinders of the pump alternately. A cover plate 77 overlies the ports 76, and is provided with ports 78 in communication with these ports in the cylinder wall. A conventional slide valve 79 overlies the cover plate 77, and is adapted to cover one of the ports 78 selectively and also a port 80 intermediate these ports. This port 80 is formed in the cover 77, and communicates with the conduit 81 through which acid is fed to the pump. A discharge port 78' interconnects the uncovered exhaust port 78 with the discharge line 81'.

A closure plate 82 is secured to the top of the cover plate 77, and is adapted to cover the port 78 which is not, at that time, covered by the valve 79 in any given extreme position thereof. This closure plate also surrounds the valve 79. The port 78, which is uncovered in any given cycle of the operation of the pump, communicates through the interior of the cover plate 82 and the discharge port 78' with the portion 81' of the acid feed conduit adjacent the mixer D, while the covered ports communicate through connections with the port 80 with the portion 81 of this conduit. It will be noted as a feature of this design that the fluid pressure due to the exhaust from the pump at any given moment tends to press the valve 79 downwardly against its seat and thereby to maintain this valve in fluid sealing position. This valve is also held in place by means of a holding-plate 83, which is adjustably secured in the top of the closure plate 82, by means of a screw 84 extending upwardly therefrom. The valve rod 63 passes through a guide in the cover plate 82, and is secured to the valve 79. The pistons 85 of the acid feeding pump are of the conventional design used in pumps of the outside packed type, and are inter-connected by yokes 86 secured to each of these pistons adjacent their extremities and tie-rods 87 inter-connecting these yokes. These tie-rods reciprocate through guides 88, which may form a part of the cylinder casting.

In the normal operation of the system, fluid passing through the meter 12, will effect a constant movement of one or the other of the pistons 19, 20, and this movement will result in a shift in the position of the rod 56 every time a volume of oil corresponding to one-half of the combined displacement capacity of the cylinders 13, 14, 15 and 16 has flowed through the system. Each such movement of the rod 56 will effect a corresponding movement of the valve rod 57' to shift the position of the valve 59 and permit a complete stroke of the piston 61 to take place in one direction or the other, depending upon its previous position. This movement of the piston 61 will effect a corresponding movement of the piston rod 62, and consequently shift the valve rod 63 and the valve 79 from a position in which it covers one of the ports 78 and the port 80 to a position in which it covers the other of these ports 78 and the port 80. The valve 66 will be moved in a direction corresponding to the movement of the valve 79. The movement of the valve 66 will lag somewhat behind that of the valve 79, however, as the abutments 64 are spaced apart a distance greater than the width of the boss 65. This spacing will afford a lost motion connection between the movements of these two valves. As soon as the valve 66 has been shifted to its new position, a movement of the piston 68 in the cylinder 67 will take place to effect a feed of acid through the pump. The lost motion connection between the operating mechanisms for the valves 79 and 66 makes it possible to insure a shifting of the valve 79 before the piston 68 has begun its stroke. By this arrangement, it is therefore possible to insure the complete coverage of the desired ports in the pump before its feeding stroke has been initiated.

Illustrating the above described cycle with respect to the showing of Figure 4, it is to be noted that in that figure the right-hand piston of the acid feeding pump has just completed its feeding stroke. After the completion of this stroke, the parts will remain in this position until the completion of the necessary feed of oil to shift the valve 59 and thereby effect a movement of the valves 79 and 66 to the right, the valve 79 completing its movement before the valve 66 is shifted to admit steam to the left end of the cylinder. In this position, steam will be admitted to the left side of the piston 68 and allowed to exhaust from the right side thereof to effect the movement of the pump pistons from left to right to feed acid to the mixer in the properly proportioned amounts. After the completion of this stroke, the piston 68 and valve 79 and associated parts will remain in their extreme right-hand position until the volume of oil passing through the meter 12 has effected a return movement of the valve 59 to effect the reverse movement of the valves 79 and 66 and corresponding movement of the pis-ton 68 to the left. It will thus be seen that a stroke of the pump to the left or the right ensues upon the completion of the feed of a pre-determined quantity of oil through the meter 12 in every case. The speed of such stroke may be regulated by throttling the feed passages 100 through which motive fluid is fed to the cylinder 67 as illustrated in Figure 11. Either or both of the passages leading to opposite ends of the cylinder may be throttled to a controlled degree by means of screws 99 adapted to cut off a portion of the passages 100 and thereby limit the force with which the piston 71 impacts fixed parts at opposite ends of its stroke. The speed of reciprocation of the piston 61 is also controlled by the adjustment of similar screws adapted to partially close passages interconnecting piston valve 59 with opposite ends of the cylinder 60. The speeds of reciprocation of these two pistons are thus independently controlled.

In accordance with my invention, I have also provided means whereby the feed of acid or other auxiliary liquid may be controlled independently of the feed of oil, where desired. The details of these mechanisms are shown in Figures 8 and 9.

The rod 56 is inter-connected with the valve rod 57' by means of an adjustable linkage 58 comprising a connecting link 94 pivoted to the rod 56 and inter-connected with a bifurcated link 95 which is secured to the valve rod 57' for reciprocation therewith. The link 94 is inter-connected with the bifurcated link 95 in such a way that these parts may be reciprocated together in the normal operation of the system, but may be disconnected to allow the bifurcated link 95 to be independently reciprocated to feed acid to the system or the rod 56 to be reciprocated to feed oil to the system without feeding such acid, if desired. A feature of this arrangement consists in the provision of a detachable connection adapted to afford joint reciprocation of these parts in one position and independent reciprocation thereof in a second position in which the parts are not entirely disconnected. Thus the link 94 is received between the bifurcations of the link 95, and the link 95 provided with a pin 96 over which a slot 97 in the link 94 is adapted to be received when the parts are to be jointly reciprocated. This slot is open at its lower end to afford provision for swinging the link 94 about its pivot and removing it from co-acting position with respect to the pin 96 when desired. A removable pin 98 is adapted to be received within aligned openings in the bifurcations of the link 95 and over-lie the upper side of the link 94 in its operative position to maintain the slot in the link 94 in co-acting position with respect to pin 96. A second pair of aligned openings 98' is provided in the bifurcated link 95 in horizontal alignment with the pin 96, rearwardly thereof.

When it is desired to effect independent operation of the link 95 and the valve rod 57 with respect to the rod 56, it is necessary to remove the pin 98 from the position shown in Figure 8 and raise the link 94 from the position shown in Figures 8 and 9 to the position shown in Figure 10 and push pin 98 through the aligned openings 98'. It will be seen that in this position the slot in the link 94 will no longer co-act with the pin 96 but that this link now merely rides freely over the pins 96 and 98, being guided between these pins and a central bridge portion 99 of the bifurcated link 95. It will thus be seen that by the simple expedient of removing the pin 98 from the position illustrated in Figure 8 and removing this pin and the link 94 to the position shown in Figure 9, it will be possible to adjust these parts for independent operation without completely disconnecting them. When in this position the operation of the rod 56 has no effect upon the acid feeding pump and either the oil feed or the acid feed may be maintained independently of the other. When it is desired to reconnect the parts, this operation can then be very simply and quickly performed.

An arrangement of mechanism in accordance with my invention has been described in connection with a pump of the outside packed type in the above described embodiment of the invention. Many modifications of such a system are, of course, possible. In Figures 6 and 7 I have illustrated one such modification, in which impelling mechanism C', in the form of an inside packed pump, is substituted for the pump above described. It is important to note in connection with a system of the type illustrated in Figures 6 and 7, that the fluid admitted to the pump during any given cycle by positioning of the valve in its left-hand position, should be directed to the right-hand end of the pump and vice versa. In the use of an inside packed pump in this connection, it is necessary either to effect such a crossing of the passages through which liquid is fed to opposite ends of the pump, or to provide some form of motion reversing mechanism in connection with the means for moving the valves. The outside packed pump requires neither of these expedients, and thus lends itself to a simpler type of design than does the arrangement of Figures 6 and 7. The reversed arrangement of the passages is indicated at 89 in Figure 6. I have further illustrated in these figures a somewhat modified form of mechanism for adjusting the ratio between liquids. Thus, I have provided a screw 91 passing through the bolted-on head 90 at the left-hand end of the pump 92 of that figure. This screw may be adjusted to project the desired distance within the cylinder of the pump to limit its stroke, and thereby limit the amount of acid fed by the pump. The amount of oil which shifts the valves to effect a stroke of the pump is absolutely definite, and the amount of acid fed by such stroke may be varied in the manner described. It will be seen that the screw 91 for limiting the stroke of the piston affords a simple and excellent means of adjustment of the volumetric ratio. Index 90 may be secured to any fixed part of the mechanism adjacent a moving part thereof, such as the piston rod 69', and will serve to measure the length of the stroke, and consequently the amount of acid fed in each reciprocation. The screw 91 may be extended as indicated at 92, to provide the center spindle of a counter 93 which indicates the number of turns which the screw has been threaded into the end wall of the cylinder, and consequently the degree of projection of the screw into the path of the piston 85'. In connection with this adjustment of the stroke of the pump, it is interesting to note that I have attained the same result by adjusting the stroke of the pump itself in Figures 6 and 7 that has been obtained by adjusting the stroke of the motor which drives the pump in Figures 4 and 5.

Modifications will be obvious to those skilled in the art. Thus, while I have described a specific form of fluid pressure motor, it will be understood that still other types of motor, even outside of the general class of fluid pressure motors, might be substituted for the steam cylinder driving mechanisms chosen for the purpose of illustration. It is also to be noted that my invention is by no means limited in its application to the specific problem of treating oils with acids, but may be utilized in connection with many systems of chemical treatment or other systems in which it is important to feed liquids in accurately pre-determined proportions. I therefore wish it to be understood that all modifications falling within the terms of the subjoined claims, as interpreted in the light of the broad generic spirit of my invention are intended to be covered thereby.

What I claim is:

1. A feeding system for fluids comprising separate controlling and controlled conduits for a plurality of fluid streams, impelling means for feeding a fluid in a controlling conduit, a metering device in said controlling conduit including a part having a movement controlled in proportion to the volumetric flow of fluid through said controlling conduit, means controlled by the movement of said part for controlling the operation of a prime mover, positive displacement impelling means operated by said prime mover whereby to effect a volumetrically proportioned flow of fluid in a controlled conduit, said positive displacement impelling means including a valve for admitting fluid to the impelling action thereof, and means controlled by the flow of fluid through said metering device for positively actuating said valve.

2. A feeding system for fluids comprising separate controlling and controlled conduits for a plurality of fluid streams, constant pressure impelling means for feeding a fluid in a controlling conduit, a metering device in said controlling conduit including a part having a movement controlled in proportion to the volumetric flow of fluid through said controlling conduit, means controlled by the movement of said part for controlling the operation of a prime mover, positive displacement impelling means operated by said prime mover whereby to effect a volumetrically proportioned flow of fluid in a controlled conduit said positive displacement impelling means including a valve for admitting fluid to the impelling action thereof, and means controlled by the flow of fluid through said metering device for positively actuating said valve.

3. A feeding system for fluids comprising separate controlling and controlled conduits for a plurality of fluid streams, impelling means for feeding a fluid in a controlling conduit, a positive displacement meter in said controlling conduit including a part having a movement controlled in proportion to the volumetric flow of fluid through said controlling conduit, a fluid pressure motor of the positive displacement type, positive displacement impelling means driven by said fluid pressure motor and adapted to feed fluid in a controlled conduit, said positive displacement impelling means including a valve for admitting fluid to the impelling action thereof and means controlled by the movement of said part to control the operation of said fluid pressure motor and said valve and thereby effect an accurately proportioned feed of fluids in the controlling and controlled conduits.

4. A feeding system for fluids comprising separate controlling and controlled conduits for a plurality of fluid streams, constant pressure impelling means for feeding a fluid in a controlling conduit, a positive displacement meter in said controlling conduit including a part having a movement controlled in proportion to the volumetric flow of fluid through said controlling conduit, a fluid pressure motor of the positive displacement type, positive displacement impelling means driven by said fluid pressure motor and adapted to feed fluid in a controlled conduit, said positive displacement impelling means including a valve for admitting fluid to the impelling action thereof and means controlled by the movement of said part to control the operation of said fluid pressure motor and said valve and thereby effect an accurately proportioned feed of fluids in the controlling and controlled conduits.

5. A feeding system for fluids comprising separate controlling and controlled conduits for a plurality of fluid streams, impelling means for feeding a fluid in a controlling conduit, a metering device in said controlling conduit including a part having a movement controlled in proportion to the volumetric flow of fluid through said controlling conduit, a reciprocating fluid pressure motor including a valve adapted to be moved into different positions to effect the operation of said motor, a reciprocating fluid pressure pump adapted to feed fluid in a controlled conduit, a valve for controlling the operation of said pump, connections between said motor and said pump for driving the pump, and means controlled by the movement of said part for controlling the operation of the valves of said motor and said pump.

6. A feeding system for fluids comprising separate controlling and controlled conduits for a plurality of fluid streams, impelling means for feeding a fluid in a controlling conduit, a metering device in said controlling conduit including a part having a movement controlled in proportion to the volumetric flow of fluid through said controlling conduit, a reciprocating fluid pressure motor including a valve adapted to be moved into different positions to effect the operation of said motor, a reciprocating fluid pressure pump adapted to feed fluid in a controlled conduit, a valve for controlling the operation of said pump, connections between said motor and said pump for driving the pump, means controlled by the movement of said part for controlling the operation of the valves of said motor and pump, and a lost motion connection between the operating connections to the pump valve and motor valve, respectively, whereby to insure a movement of the pump valve prior to a corresponding movement of the motor valve.

7. A feeding system for fluids comprising separate controlling and controlled conduits for a plurality of fluid streams, impelling means for feeding a fluid in a controlling conduit, a positive displacement metering device in said controlling conduit including a part having a movement controlled in proportion to the volumetric flow of fluid through said controlling conduit, a reciprocating fluid pressure motor including a valve adapted to be moved into different positions to effect the operation of said motor, a reciprocating fluid pressure pump adapted to feed fluid in a controlled conduit, a valve for controlling the operation of said pump, a servo-motor including a reciprocating part adapted to control the movements of the valves for controlling the operation of the pump and fluid pressure motor, the connections between said servo-motor and the valve for controlling said fluid pressure motor including a lost motion connection, and means controlled by the movement of said part for controlling the operation of said servo-motor.

8. A feeding system for fluids comprising separate controlling and controlled conduits for a plurality of fluid streams, impelling means for feeding a fluid in a controlling conduit, a metering device in said controlling conduit including a part having a movement controlled in proportion to the volumetric flow of fluid through said controlling conduit, a reciprocating fluid pressure motor including a valve adapted to be moved into different positions to effect the operation of said motor, a reciprocating fluid pressure pump adapted to feed fluid in a controlled conduit, a valve for controlling the operation of said pump, a servo-motor for effecting movement of the valves controlling the operation of said pump and said fluid pressure motor, and means controlled by the movement of said part for controlling the operation of said servo-motor.

9. A feeding system for fluids comprising separate controlling and controlled conduits for a plurality of fluid streams, impelling means for feeding a fluid in a controlling conduit, a metering device in said controlling conduit including a part having a movement controlled in proportion to the volumetric flow of fluid through said controlling conduit, a reciprocating fluid pressure motor including a valve adapted to be moved into different positions to effect the operation of said motor, a reciprocating fluid pressure pump adapted to feed fluid in a controlled conduit, a valve for controlling the operation of said pump, a reciprocating servo-motor interconnected with the valve for controlling the operation of the pump and including a reciprocating part provided with projections adapted to co-act with a boss to effect a movement of the valve for controlling the operation of the fluid pressure motor, said projections being spaced apart a distance greater than the width of said boss whereby to afford a lost-motion connection between the operation of the valves of the pump and fluid pressure motor, and means controlled by the movement of said part for controlling the operation of the servo-motor in proportion to the flow of fluid in the controlling conduit.

10. A feeding system for fluids comprising separate controlling and controlled conduits for a plurality of fluid streams, impelling means for feeding a fluid in a controlling conduit, a metering device in said controlling conduit including a part having a movement controlled in proportion to the volumetric flow of fluid through said controlling conduit, a prime mover adapted to control the feed of fluid in a controlled conduit, means for controlling the operation of said prime mover, and means interconnecting said part and said last-named means for conjoint or independent operation.

11. A feeding system for fluids comprising separate controlling and controlled conduits for a plurality of fluid streams, impelling means for feeding a fluid in a controlling conduit, a metering device in said controlling conduit including a part having a movement controlling a prime mover adapted to control the feed of fluid in a controlled conduit, means for controlling the operation of said prime mover, and means interconnecting said part and said last-named means for conjoint or independent operation, said interconnecting means including parts adapted to be conjointly reciprocated in one position of adjustment and relatively slidably connected in another position of adjustment.

12. A feeding system for fluids comprising separate controlling and controlled conduits for a plurality of fluid streams, impelling means for feeding a fluid in a controlling conduit, a metering device in said controlling conduit including a part moved in proportion to the volume of fluid passing through said controlling conduit, a reciprocating fluid pressure motor controlled by said part and adapted to reciprocate in response to the movement thereof, a second reciprocating fluid pressure motor controlled by the reciprocating movement of said first reciprocating fluid pressure motor, and separate screw means for controlling the flow of fluid to the respective fluid pressure motors whereby to independently control the speed of movement of the respective reciprocating strokes thereof.

13. A feeding system for fluids comprising separate controlling and controlled conduits for a plurality of fluid streams, impelling means for feeding a fluid in a controlling conduit, a metering device in said controlling conduit including a part having a movement controlled in proportion to the flow of fluid through said controlling conduit, a reciprocating fluid pressure motor including a valve adapted to be moved into different positions to effect the operation of said motor, a fluid pressure pump adapted to feed fluid in a controlled conduit, a valve for admitting fluid to the impelling action of said pump, connections between said motor and said pump for driving the pump and means controlled by the movement of said part for controlling the operation of said motor and said pump, said means being operative to effect operation of the pump valve to fluid admitting position prior to the period in the cycle of operations at which said means operates to actuate the valve of the fluid pressure motor to a position in which said motor is operated to drive said pump in its impelling stroke.

LEO D. JONES.